C. OWENS.
GEAR DRIVE FOR TRACTION WHEELS AND JACK SHAFTS.
APPLICATION FILED APR. 15, 1920.

1,405,430.  Patented Feb. 7, 1922.

Inventor
Charles Owens
By Spear, Middleton, Donaldson & Hall
Attorney

UNITED STATES PATENT OFFICE.

CHARLES OWENS, OF CHATTANOOGA, TENNESSEE.

GEAR DRIVE FOR TRACTION WHEELS AND JACK SHAFTS.

1,405,430.   Specification of Letters Patent.   Patented Feb. 7, 1922.

Application filed April 15, 1920. Serial No. 374,154.

*To all whom it may concern:*

Be it known that I, CHARLES OWENS, a citizen of the United States, and resident of Chattanooga, county of Hamilton, State of Tennessee, have invented certain new and useful Improvements in Gear Drives for Traction Wheels and Jack Shafts, of which the following is a specification.

One object of my invention is to provide a gear drive for truck or tractor wheels which will permit the wheel to be removed as readily as an ordinary wheel, it having combined therewith a portion or portions of the gear drive which will remain permanently mounted on the wheel when removed and will readily couple up with cooperating members which remain on the fixed housing or frame.

Another object of the invention is to provide a drive mechanism which will impart driving power to a traction wheel and also to a jack shaft which is closely associated with the driving mechanism of the tractor or truck wheel.

The invention is shown in the accompanying drawings of which:

Figure 1:
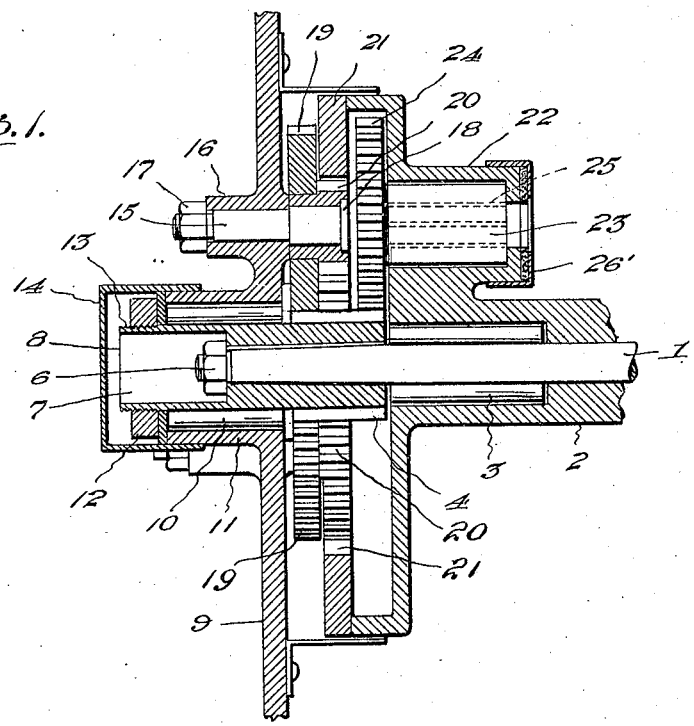
Figure 1 is a central longitudinal section along the drive shaft or axle showing a part of the wheel, the housing in part and the gearing.
Figure 2:
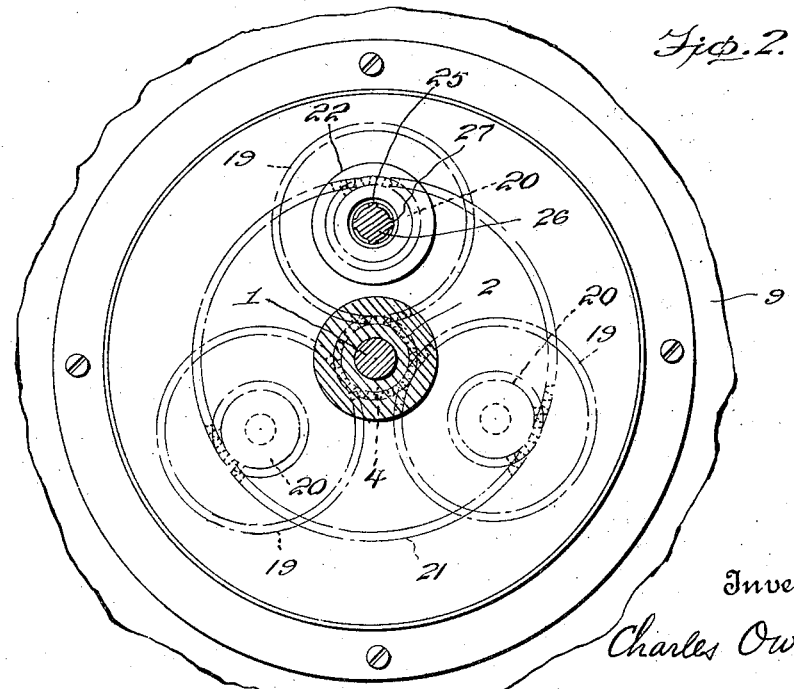
Fig. 2 is a side elevation of the parts shown in Fig. 1 with the gearing represented in dotted lines.

In these drawings 1 indicates a drive shaft or axle of a truck or tractor which may be driven through the differential as in ordinary practice. This drive shaft extends out through a housing or frame 2 and it is journaled in roller bearings 3 mounted in a recess in the housing. The shaft at its outer end carries a drive pinion 4 which is keyed thereto and which is held in place by a nut 6. This nut is located in a counter bore 7 of a sleeve extension 8 of the driving pinion, these parts preferably being formed in one piece. A portion of the traction wheel is indicated at 9 and this is journaled on roller bearings 10 arranged about the sleeve extension 8 of the driving pinion. These roller bearings are within the hub 11 of the traction wheel and the wheel is held in place by a nut 12 engaging a thread 13 on the end of the sleeve extension of the driving pinion. A suitable cap 14 may be slipped onto the hub to keep dust from the bearings. The wheel carries pins 15, these being mounted in bosses 16 and held by nuts 17. Journaled upon the inner ends of these pins which are headed at 18 are the gears 19 and pinions 20. The gears 19 and pinions 20 are connected together to move as one body, the former meshing with the drive pinion 4 and the latter meshing with a rack 21, fixed to the housing 2.

Rotation of the drive shaft 1 will through the drive pinion 4 rotate the gear 19 and as the pinion 20, connected with this gear meshes with the rack 21, the pinion with the gear must roll about this rack 21 and thus the traction wheel will be set in revolution to impel the tractor or truck.

The housing 2 is provided with a hollow boss 22 which forms a bearing socket for the hub 23 of a gear wheel 24 which lies between the overhanging rack 21 and the face of the housing, the said gear 24 meshing with and being driven from the drive pinion 4. The hub 23 of the gear 24 is provided with a longitudinal bore, or opening grooved as at 25 to receive the jack shaft 26 which is provided with ribs 27 to fit into the grooves so that the turning of the hub through the operation of the gear 24 and pinion 4 will drive the jack shaft.

Any suitable form of cap may be used at 26′ to exclude dust from the boss 22.

It will be noticed from the above that the traction wheel and the jack shaft are both driven from the same pinion and the jack shaft may be utilized to drive any suitable mechanism such as the operative parts of a binder or any other implement which may be attached to the tractor as a trailer. The traction wheel readily may be removed by unscrewing the nut 12 and when so removed it will carry with it the planetary gearing which is made up of any desired number of sets of gears and pinions 19 and 20, and the wheel may be readily slipped back into place and the gears 19 and pinions 20 caused to mesh respectively with the drive pinion 4 and toothed rack 21.

I claim as my invention:—

1. In combination with a drive shaft a pinion having a sleeve extension and together therewith arranged coaxially with and driven from said drive shaft, a traction wheel having its hub mounted on the sleeve extension, a frame or housing, a circular rack fixed thereto and planetary gearing mounted on the traction wheel and meshing respectively with the drive pinion and with the rack, so as to turn the wheel when the axle or drive wheel is rotated, said traction wheel being wholly supported by the sleeve extension and lying wholly on the outer side of said rack and housing to be removable with its gearing as one body, substantially as described.

2. In combination with a drive shaft, a pinion having an outwardly extending sleeve extension, said parts being arranged coaxially with and driven by the said drive shaft, a traction wheel having its hub on the sleeve extension out beyond the pinion, a frame or housing at the inner side of the traction wheel, a circular rack fixed to said frame and planetary gearing mounted on the inner side of the traction wheel and meshing with the drive pinion and also with the rack and a nut mounted on the sleeve extension to hold the traction wheel in place, said traction wheel with its planetaries being removable without removing the rack or housing, or the pinion.

3. In combination a load bearing axle driven through differential mechanism, a traction wheel journalled to turn about the said axle, gearing between the load bearing axle and traction wheel to propel the vehicle, a jack shaft and gearing between the said load bearing axle and jack shaft whereby the latter will be driven from and synchronize with the various speeds of said axle, in turning corners, substantially as described.

4. In combination a drive shaft, a traction wheel rotated about the same, toothed means connected with and driven by the drive shaft, a jack shaft arranged parallel with the drive shaft, a rack, a housing to which the rack is fixed, planetary gearing between the toothed means and the rack and mounted on the traction wheel and a gear for transmitting motion from the toothed means to the jack shaft, substantially as described.

5. In combination a drive shaft, a traction wheel, a housing, a rack fixed to the housing, toothed means connected with the shaft, planetary gearing carried by the traction wheel and engaging the rack, a gear located between the rack and the housing meshing with said toothed means and a jack shaft driven by the said gear, substantially as described.

6. In combination with a rotating axle, toothed means connected therewith, a traction wheel, a housing, a rack mounted on the housing and planetary gearing on the traction wheel meshing with the rack and toothed means, said traction wheel being located on the outer side of the rack and mounted to be removed with the planetary gearing as one body, a jack shaft and a gear on the jack shaft meshing with the toothed means, said housing overhanging the gear last mentioned and the rack reaching down over the outer face of said gear, substantially as described.

In testimony whereof, I affix my signature.

CHARLES OWENS.